US007556010B2

United States Patent
Egawa et al.

(10) Patent No.: US 7,556,010 B2
(45) Date of Patent: Jul. 7, 2009

(54) MULTICYLINDER INTERNAL COMBUSTION ENGINE WITH RESONATOR

(75) Inventors: Takeshi Egawa, Saitama (JP); Kenji Koga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/902,182

(22) Filed: Sep. 19, 2007

(65) Prior Publication Data

US 2008/0072863 A1 Mar. 27, 2008

(30) Foreign Application Priority Data

Sep. 20, 2006 (JP) .............................. 2006-254489

(51) Int. Cl.
 *F02M 35/10* (2006.01)
(52) U.S. Cl. .................................. 123/184.57; 181/229
(58) Field of Classification Search ............ 123/184.53, 123/184.57; 181/229
See application file for complete search history.

(56) References Cited

U.S. PATENT DOCUMENTS 6,328,011 B1 * 12/2001 Jessberger et al. ..... 123/184.57

6,830,024 B2 * 12/2004 Kodweiss et al. ...... 123/184.53

FOREIGN PATENT DOCUMENTS

| CN | 1385601 A | 12/2002 |
|----|-----------|---------|
| JP | 11-82203 A | 3/1999 |
| JP | 2002-339849 A | 11/2002 |

* cited by examiner

*Primary Examiner*—Noah Kamen
(74) *Attorney, Agent, or Firm*—Westerman, Hattori, Daniels & Adrian, LLP.

(57) ABSTRACT

A multicylinder internal combustion engine E has a cylinder head 2; a cylinder head cover 3; an intake manifold 20 having a header body 21 disposed right above an engine body and intake runners 22; and a resonator 50. Each of the intake runners 22 has a bend 24 extending away from cylinder axes L in a longitudinal direction A2 perpendicular to the cylinder axes L, and curving so as to extend reversely toward the cylinder axes L. The resonator 50 is disposed opposite to the engine body with respect to the intake manifold 20 and is nearer to the cylinder axes L than outermost end parts 24*a* of the bends 24. The engine including the intake manifold and the resonator can be formed in a small dimension with respect to a longitudinal direction perpendicular to the cylinder axes, and the resonance chamber of the resonator can be easily formed to have a necessary volume.

4 Claims, 3 Drawing Sheets

MULTICYLINDER INTERNAL COMBUSTION ENGINE WITH RESONATOR

BACKGROUND OF THE INVENTION

1. Field of the Invention

The present invention relates to a multicylinder internal combustion engine having an intake system including an intake manifold, and a resonator forming a resonance chamber communicating with an intake passage defined by the intake manifold.

2. Description of the Related Art

A known multicylinder internal combustion engine disclosed in, for example, JP 11-82203 A has an engine body provided with plural cylinders, an intake manifold having a header body defining an intake chamber, and runners defining branch passages branched off from the intake chamber, and a resonator defining a resonance chamber communicating with the intake chamber and formed integrally with the header body.

A multicylinder internal combustion engine is known as disclosed in, for example, JP 2002-339849 A. This known internal combustion engine is provided with an intake manifold having runners having reversed bends.

An internal combustion engine provided with an intake manifold having runners extending from joints on an engine body in a longitudinal direction perpendicular to a plane containing the axes of cylinders (reference plane) and parallel to a lateral direction in which cylinders are arranged is disadvantageous because of a large dimension of the engine with respect to the longitudinal direction. The above disadvantage can be eliminated by forming reversing bends in the runners such that the runners are closer to the engine body to reduce the dimension of the internal combustion engine with respect to the longitudinal direction. In this case, if a resonator is disposed on the inner side of the bends, the bends need to be shifted away from the engine body by a distance corresponding to the longitudinal dimension of the resonator and, consequently, the longitudinal dimension of the internal combustion engine cannot be fully reduced. In some cases, engine components including fuel pipes and fuel injection valves are disposed on the side of the engine body with respect to the intake manifold, i.e., on the inner side of the bends. In such a case, the size of the resonator is subject to restrictions to avoid interference between the engine components and the resonator and it is difficult to form the resonator in a necessary volume.

The present invention has been made under such circumstances and it is therefore an object of the present invention to provide a multicylinder internal combustion engine provided with an intake manifold and a resonator, and achieving both reducing its longitudinal dimension and forming the resonator in a necessary volume. Another object of the present invention is to facilitate forming a resonance chamber in a necessary volume without being subject to restrictions placed by engine components disposed on the side of an engine body with respect to a manifold, and by the engine body, and to form runners in high rigidity. A further object of the present invention is to facilitate forming a connecting passage connecting the body of an intake manifold and the resonance chamber of a resonator, and setting a resonance frequency, and to form the connecting passage in a small size.

SUMMARY OF THE INVENTION

To attain the above objects, the present invention provides a multicylinder internal combustion engine comprising: an engine body having plural cylinders; an intake manifold having a header body disposed opposite to the engine body with respect to a direction parallel to cylinder axes of the cylinders and defining an intake chamber, and intake runners respectively defining intake runner passages branching off from the intake chamber of the header body and communicating with the cylinders; and a resonator defining a resonance chamber communicating with the intake chamber: wherein each of the intake runners has a downstream part joined to an intake joint on the engine body, and a bend extending away from the cylinder axes in a direction perpendicular to the cylinder axes, and curving so as to extend reversely toward the cylinder axes to connect to the downstream part; and the resonator is disposed opposite to the engine body with respect to the intake manifold and is nearer to the cylinder axes than outermost end parts of the bends with respect to the direction perpendicular to the cylinder axes.

According to the present invention, the intake runners of the intake manifold have the bends curved so as to extend longitudinally toward the cylinder axes after longitudinally extending away from the cylinder axes, and the resonator is nearer to the cylinder axes than the outermost parts of the bends of the intake runners. Therefore, the resonator does not protrude longitudinally outward beyond the bends and hence the internal combustion engine including the resonator can be formed in a small longitudinal dimension. Since the resonator is disposed opposite to the engine body with respect to the intake manifold, the resonance chamber of the resonator can be formed in a large volume and the resonance chamber can be easily formed in a large volume without being subject to restrictions placed by the engine components disposed between the intake manifold and the engine body.

According to the present invention, the intake runners have upstream parts connecting the bends to the header body, and at least a part of the resonator may be formed integrally with the upstream parts opposite to the engine body with respect to the intake runners.

When at least a part of the resonator is formed integrally with longitudinally outer parts of the upstream parts with respect to the engine body, the resonance chamber of the resonator can be formed in a sufficiently large volume without being subject to restrictions placed by the engine body and the engine components disposed beside the engine body. The unification of the resonator and the intake runners increases the rigidity of the intake runners.

Preferably, the resonator includes a base extending on the header body and the intake runners, and a cover covering the base; the base and the cover are joined together to form the resonance chamber and a connecting passage connecting the resonance chamber and the intake chamber; the connecting passage has an opening which is formed in the base at one end of the connecting passage and which opens into the intake chamber; the resonator has a passage wall formed therein to define the connecting passage and separating the connecting passage from the resonance chamber; and the passage wall extends in a direction in which the intake runner passages are arranged and is formed integrally with at least one of the base and the cover.

Thus the connecting passage is isolated from the resonance chamber by the passage wall formed integrally with the base or the cover and can be easily formed by joining the cover to the base. Since the volume of the connecting passage can be changed by changing the length of the passage wall extending in the direction in which the intake runner passages are arranged, a proper resonance frequency can be easily determined. Since the connecting passage is formed in the resonator, the connecting passage can be compactly formed and the resonator has an improved appearance.

In a typical embodiment of the present invention, the resonator includes a base extending on the header body and the intake runners, and a cover covering the base, and the cover is provided on an inside surface thereof with plural ribs extending in a direction in which the cylinders are arranged.

The ribs formed on the inside surface of the cover increase the rigidity of the cover, and suppresses the vibration of the cover. Thus noise generated by the vibration of the cover can be reduced.

Preferably, the resonator includes a base extending on the header body and the intake runners, and a cover covering the base, and the cover is a top member of the internal combustion engine.

Since the cover is the top member of the internal combustion engine, the cover serves also as an engine cover that can improve the aesthetic design of the internal combustion engine.

DESCRIPTION OF THE PREFERRED EMBODIMENTS

A multicylinder internal combustion engine in a preferred embodiment of the present invention will be described with reference to FIGS. 1 to 4.

Figure 1:
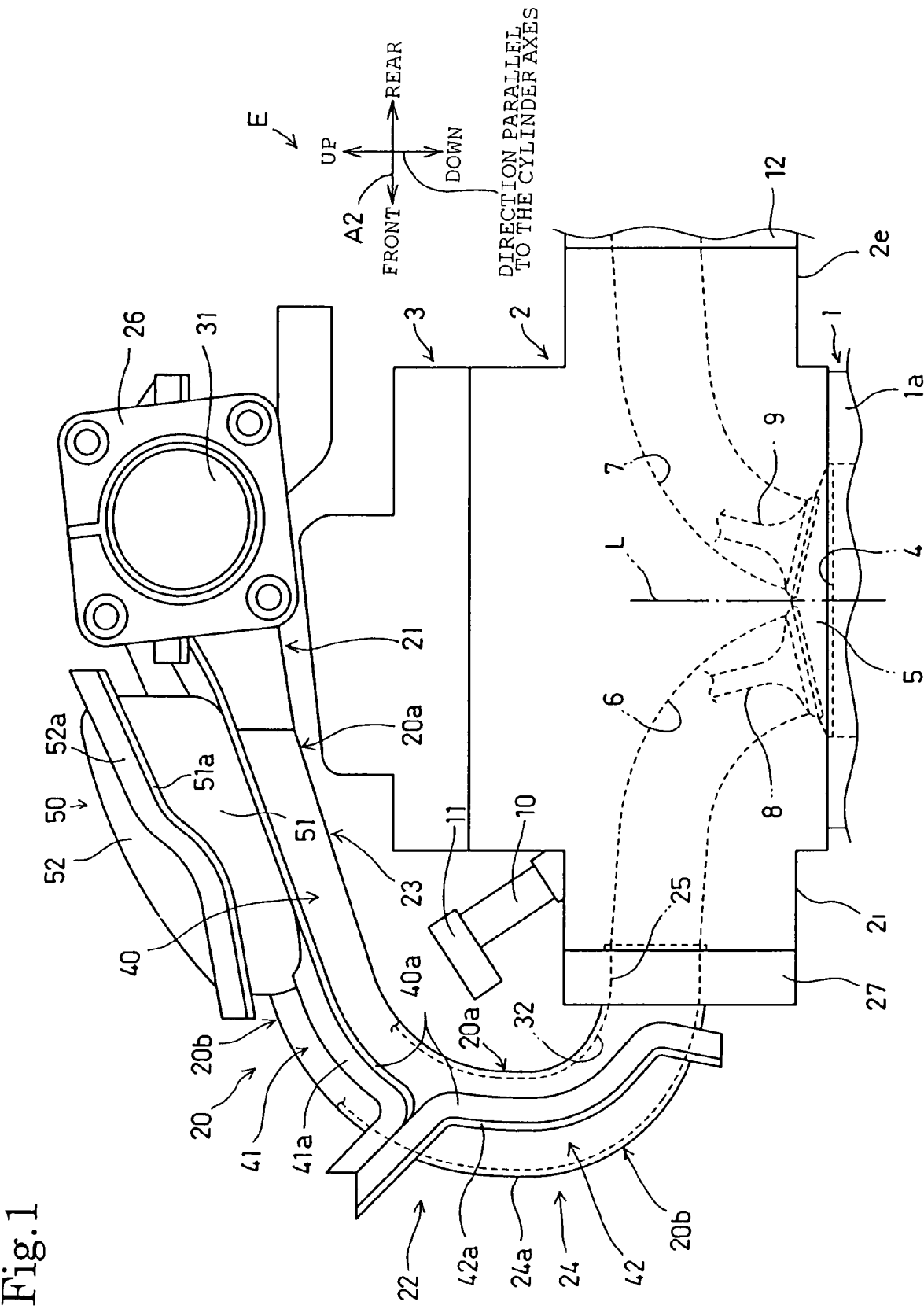
FIG. 1 is an end view of an essential part of a multicylinder internal combustion engine in a preferred embodiment of the present invention, as viewed in a lateral direction in which cylinders are arranged.

Referring to FIG. 1, a multicylinder internal combustion engine E embodying the present invention is an in-line four-stroke internal combustion engine. The multicylinder internal combustion engine E is a transverse engine mounted on a vehicle with its crankshaft, not shown, extended perpendicularly to the longitudinal axis of the vehicle.

Hereinafter, vertical directions, longitudinal directions and lateral directions are indicated by the arrows shown in FIGS. 1 and 3. The vertical directions are parallel to the axes of the cylinders. The lateral and the longitudinal directions perpendicularly intersect each other and are perpendicular to the axes of the cylinders (hereinafter, referred to as "cylinder axes"). The vertical, the longitudinal and the lateral directions coincide substantially with vertical, longitudinal and lateral directions, respectively, with respect to the vehicle on which the internal combustion engine E is mounted. An upward and a downward direction are a first and a second vertical direction, respectively, a forward and a rearward direction are a first and a second longitudinal direction, respectively, and a rightward and a leftward direction are a first and a second lateral direction, respectively.

The internal combustion engine E has an engine body including a cylinder block 1 provided with four cylinders 1a arranged in the lateral direction A1 (FIG. 3), a cylinder head 2 joined to the upper end of the cylinder block 1, and a cylinder head cover 3 joined to the upper end of the cylinder head 2.

Pistons 4 are fitted in the cylinders 1a of the cylinder block so as to reciprocate in the cylinders 1a, respectively. Four combustion chamber 5 are formed between the cylinder head 2 and the heads of the pistons 4. The cylinder head 2 is provided with an intake port 6 and an exhaust port 7 for each cylinder 1a. The open end of the intake port 6 opening into the combustion chamber 5, and the open end of the exhaust port 7 opening into the combustion chamber 5 are opened and closed by an intake valve 8 and an exhaust valve 9, respectively, in synchronism with the rotation of the crankshaft. Each combustion chamber 5 is a space defined by the cylinder head 2, the cylinder 1a and the piston 4 fitted in the cylinder 1a.

The internal combustion engine E further includes an intake system for carrying intake air into the combustion chambers 5, an exhaust system for carrying the exhaust gas to the outside of the internal combustion engine E, and fuel injection valves 10 attached to the cylinder head 2 to spray fuel into intake air. The intake system includes an intake manifold 20 jointed to an intake joint 2i, in which the inlets of the intake ports 6 opens, of the cylinder head 2 and having an inlet flange 26 at the upstream end thereof, and a throttle body, not shown, joined to the inlet flange 26 of the manifold 20. The exhaust system includes an exhaust manifold 12 joined to an exhaust joint 2e, in which the outlets of the exhaust ports 7 open, of the cylinder head 2. The exhaust manifold 12 carries the exhaust gas discharged from the combustion chambers 5 to the outside of the internal combustion engine E.

Intake air adjusted in flow rate by a throttle valve placed in the throttle body is sucked through the intake manifold 20 and the intake ports 6 into the combustion chambers 5 while the intake valves 8 are opened during an intake stroke. Fuel injected by the fuel injection valve 10 mixes with the intake air to produce an air-fuel mixture. The air-fuel mixture is compressed during a compression stroke and burns and produces combustion gas when the same is ignited by an ignition plug at a final stage of the compression stroke. The piston driven by the pressure of the combustion gas in an expansion stroke drives the crankshaft for rotation. The combustion gas is discharged as the exhaust gas from the combustion chambers 5 into the exhaust ports 7 while the exhaust valves 9 are open during an exhaust stroke. The exhaust gas is carried to the outside by the exhaust system including the exhaust manifold 12.

Figure 2A:
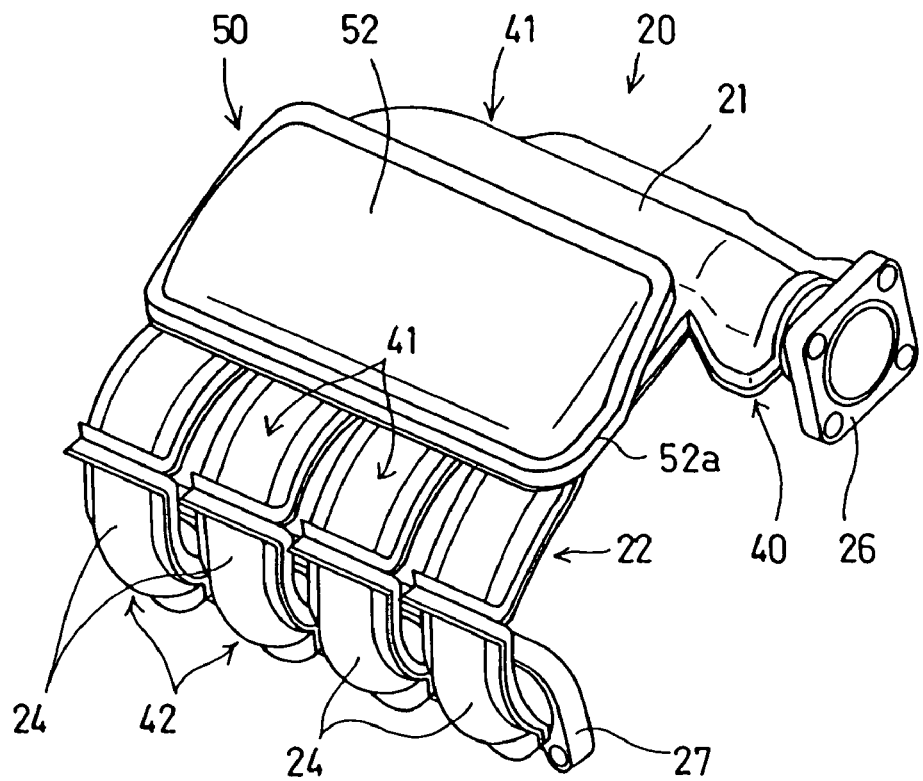
FIG. 2(a) is a perspective view of an intake manifold and a resonator included in the multicylinder internal combustion engine shown in FIG. 1.
Figure 2B:
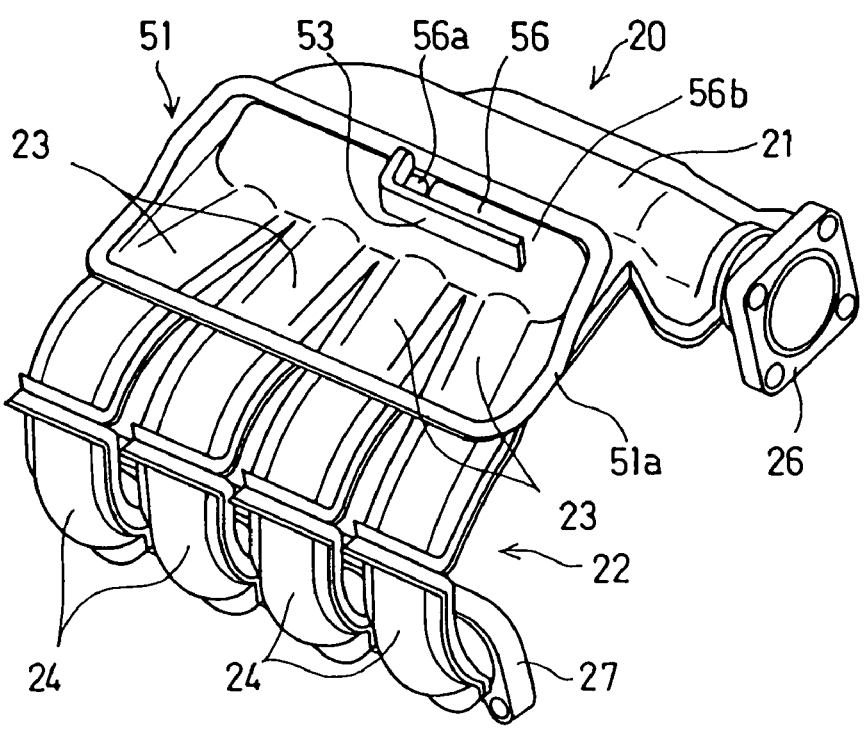
FIG. 2(b) is a perspective view, similar to FIG. 2(a), of the intake manifold and the resonator, in which a cover included in the resonator is removed.
Figure 3:
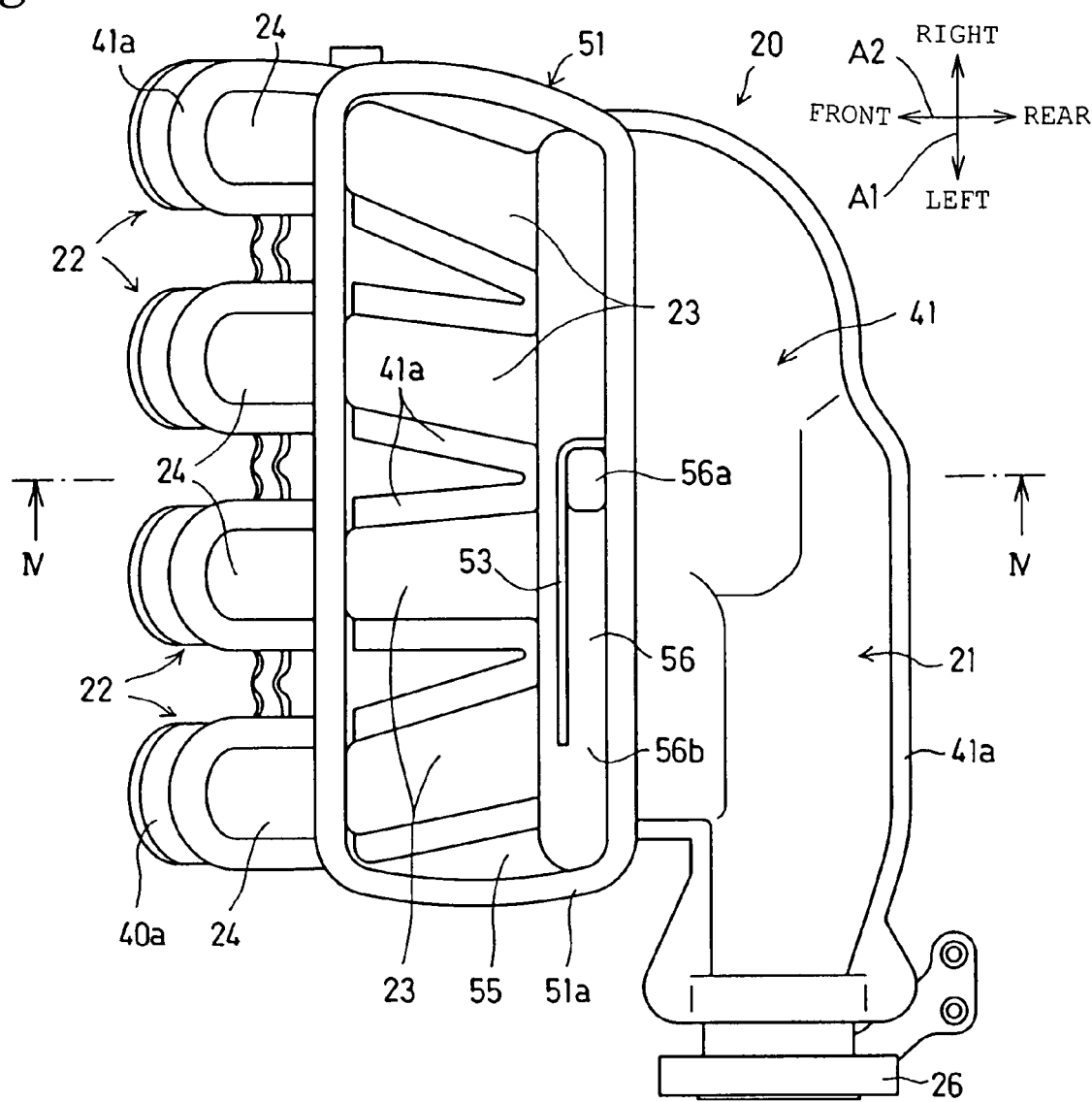
FIG. 3 is a plan view of the intake manifold and the resonator in a state shown in FIG. 2(b)
Figure 4:
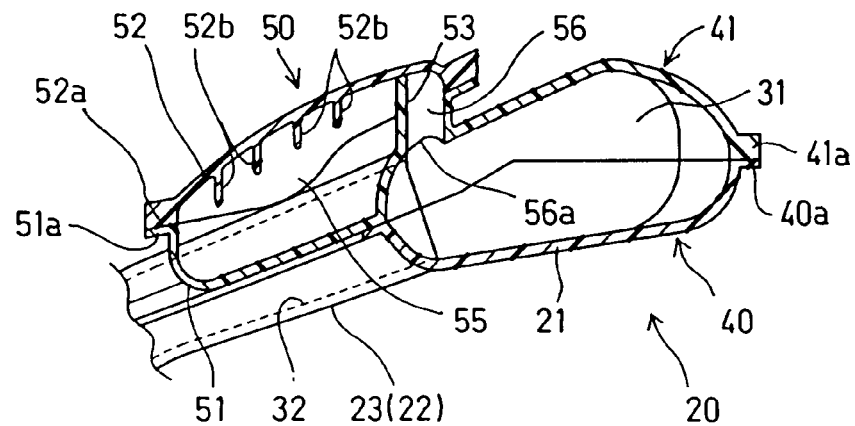
FIG. 4 is a sectional view of an essential part taken on the line IV-IV in FIG. 3.

Referring to FIGS. 2 to 4, the intake system includes a resonator 50 defining a resonance chamber 55 communicating with intake passages defined by the intake manifold 20.

The intake manifold 20 is disposed opposite to the cylinder head 2 and the cylinder head cover 3 with respect to a longitudinal direction A2 perpendicular to the lateral direction A1 in which the cylinders are arranged. The intake manifold 20 includes a header body 21 defining an intake chamber 31, four intake runners 22 defining four runner passages 32 branching off from the intake chamber 31, a flange 26 fastened to the throttle body with bolts, and a downstream flange 27 fastened to the intake joint 2i. The header body 21 is disposed directly above the cylinder head cover 3 so as to be opposite the cylinder head 2 and the cylinder head cover 3 with respect to a predetermined direction parallel to a cylinder axis L, which is one of directions perpendicular to the lateral direction A1. The intake passage of the intake manifold 20 is formed by the intake chamber 31 communicating with a passage formed in the throttle body, and the four runner passages 32 defined by the intake runners 22, which communicating with the intake chamber 31 and connected, respectively, to the intake ports 6. All the intake runners 22 and the runner passages 32 extend in the longitudinal direction A2 and are arranged side-by-side in the lateral direction A1.

As viewed in the lateral direction A1, the header body 21 is disposed at a position on or near the cylinder axes L as shown in FIG. 1. Substantially entire part of the header body 21 overlies the cylinder head 2 and the cylinder head cover 3 with respect to the longitudinal direction A2 perpendicular to the cylinder axes L and the lateral direction A1. The header body 21 extends substantially parallel to the lateral direction A1 in a range covering all the intake runners 22 with respect to the lateral direction A1. The flange 26 is formed integrally with an upstream end part of the header body 21.

Each of the intake runners 22 has an upstream part 23 having an upstream end joined to the header body 21. The upstream part 23 is a straight pipe extending obliquely downward away from the cylinder axis L and the header body 21; that is, the upstream part 23 slopes down with respect to the longitudinal direction A2 perpendicular to both the cylinder axis L and the lateral direction A1. Each of the intake runners 22 has, in addition to the upstream part 23, a downstream part 25 joined to the intake joint 2i, and a curved bend 24 extending between the upstream part 23 and the downstream part 25. Each of the bends 24 slopes down from the upstream part 23 away from the cylinder axis L with respect to the longitudinal direction A2 and then curves in a U-shape so as to extend reversely toward the cylinder axis L to the downstream part 25.

The bends 24 are parts of the intake manifold 20, farthest from the cylinder axis L. As shown in FIG. 1, the bends 24 of each intake runner 22 has an outermost end part 24a farthest from the cylinder axis L in the longitudinal direction A2. The header body 21 and the upstream part 23 are nearer to the cylinder axes L than the outermost end parts 24a.

The intake manifold 20 is formed by welding together a body 40, a first cover 41 and a second cover 42 by welded parts 40a, 41a, and 42a. The body 40, the first cover 41 and the second cover 42 are made of a synthetic resin. The body 40 extending over the entire length of the intake manifold 20 forms respective lower walls of the header body 21 and the intake runners 22 facing the cylinder head 2 and the cylinder head cover 3. The body 40 also forms inner walls 20a (FIG. 1) of the bends 24 on the side of the cylinder axes L. The flanges 26 and 27 are formed integrally with the body 40. The first cover 41 forms the respective upper walls of the header body 21 and the upstream parts 23, and the second cover 42 forms the outer walls 20b (FIG. 1) of the bends 24 opposite the inner walls 20a.

Fuel injection valves 10 and fuel pipes 11 connected to the fuel injection valves 10, namely, engine components, are disposed in a space extending beside the cylinder head 2 and the cylinder head cover 3 with respect to a direction parallel to the cylinder axes L or with respect to the longitudinal direction A2, under the intake manifold 20 or on the inner side of the bends 24.

Referring to FIGS. 1 to 4, the resonator 50 having a shape resembling a flat rectangular solid is formed on the upper walls of the upstream parts 23. The resonator 50 is opposite to the cylinder head 2 and the cylinder head cover 3 with respect to the intake manifold 20. At least part of the resonator 50 is unified with the upper walls, which are opposite the lower walls facing the cylinder head 2 and the cylinder head cover, of the upstream parts 23 of the intake runners 22 connecting the header body 21 and the bends 24. The resonator 50 extends substantially parallel to the lateral direction A1 in a range covering all the intake runners 22.

The resonator 50 is disposed right above the cylinder head 2 and the cylinder head cover 3 and is at substantially the same position as the header body 21 with respect to the direction parallel to the cylinder axes L as shown in FIG. 4. The resonator 50 is nearer to the cylinder axes L than the outermost end parts 24a with respect to the longitudinal direction A2. The resonator 50 is disposed at a position nearer to the cylinder axes L than the bends 24 and between the header body 21 and the bends 24.

The resonator 50 has a base 51 extending on the upper surfaces of the header body 21 and the upstream pats 23 of the intake runners 22, and a cover 52 put on and welded to the base 51 by welded parts 51a and 52a. The base 51 and the cover 52 are made of a synthetic resin. The resonance chamber 55 of the resonator 50 and a connecting passage 56 connecting the resonance chamber 55 to the intake chamber 31 are defined by joining together the base 51 and the cover 52.

The connecting passage 56 is extended inside the resonator 50. The connecting passage 56 extends across the runner passages 32 in the lateral direction A1. As best shown in FIG. 2(b), the connecting passage 56 is isolated from the resonance chamber 55 of the resonator 50 by a passage wall 53 rising from the bottom wall of the resonator 50 in a direction parallel to the cylinder axes L. The passage wall 53 is formed integrally with the base 51 in a shape substantially resembling the letter L. The passage wall 53 is formed not to reach the side ends of the interior space of the resonator 50. The passage wall 53 is welded to the cover 52 to form the connecting passage 56 when the base 51 and the cover 52 are welded together. The connecting passage 56 has an inlet 56a formed in a middle part with respect to the lateral direction A1 of the base 51 and opening into the intake chamber 31, and an outlet 56b opening into the resonance chamber 55 at a position on one side of a middle part of the resonance chamber 55 with respect to the lateral direction A1. The inlet 56a is a through hole formed in the base 51. The outlet 56b is defined by the base 51, the cover 52 and the passage wall 53.

The volume of the connecting passage 56 can be easily changed by changing the length of the passage wall 53 parallel to the lateral direction A1. Therefore, a resonance frequency suitable for enhancing the torque of the internal combustion engine E or for suppressing noise can be properly determined by changing the length of the passage wall 53.

The base 51 is formed integrally with the first cover 41 forming the respective upper walls of the header body 21 and the upstream parts 23. Therefore, the base 51 forming the bottom wall of the resonance chamber 55 is integrally unified with the upstream parts 23 of the intake runners 22.

The cover 52 is provided on its inside surface with plural ribs 52b (FIG. 4) extending in the lateral direction A1. The ribs 52b give rigidity to the cover 52, suppress vibration of the cover 52 and reduce noise generated by the vibration of the resonator 50. The cover 52 as a top member of the internal combustion engine E serves also as an engine cover that can improve the aesthetic appearance of the internal combustion engine E.

The operation and effect of the embodiment will be described.

Each of the intake runners 22 of the intake manifold has the downstream part 25, and the bend 24 extending outward in the longitudinal direction A2, curving in a U-shape so as to extend reversely toward the cylinder axis L and extending to the downstream part 25. The resonator 50 is disposed opposite to the cylinder head 2 and the cylinder head cover 3 with respect to the intake manifold 20 and is nearer to the cylinder axes L than the outermost end parts 24a of the bends 24 with respect to the longitudinal direction A2. Since the resonator 50 is disposed on the intake manifold 20 opposite to the cylinder head 2 and the cylinder head cover 3 with respect to the intake manifold 20, the resonance chamber 55 can be easily formed to have a desired large volume without being restricted in installation space by the fuel pipes 11 and the fuel injection valves 10.

Since the intake runners 22 has the bends 24 curved so as to extend away from the cylinder axes L in the longitudinal direction A2 and to extend reversely toward the cylinder axes L, and the header body 21 and the resonator 50 are nearer to the cylinder axes L than the outermost parts 24a of the bends 24, the resonator 50 does not protrude in the longitudinal direction A2 beyond the bends 24 and hence the resonator 50 does not increase the dimension of the internal combustion engine E with respect to the longitudinal direction A2.

The intake runners 22 have the upstream parts 23 connecting the bends 24 to the header body 21, respectively, and at least part of the resonator 50 is unified with the upper walls of the upstream parts 23 opposite the lower walls thereof on the side of the cylinder head 2 and the cylinder head cover 3. Therefore, the resonance chamber 55 can be formed to have a sufficiently large volume without being subject to restrictions placed by the engine components disposed under the intake manifold 20 including the fuel pipes 11 and the fuel injection valves 10, the cylinder head 2 and the cylinder head cover 3. Since the intake runners 22 are integrally unified with the resonator 50, the intake runners 22 are rigid. Further, since the upstream part 23 extends straight downward, a space is formed above the upstream part 23, which space allows the resonator 50 to be disposed effectively therein.

The disposition of the header body 21 and the resonator 50 right above the cylinder head 2 and the cylinder head cover 3 with respect to the direction parallel to the cylinder axes L is effective in further reducing the dimension of the internal combustion engine E in the direction parallel to the cylinder axes L.

The resonator 50 is formed by joining together the cover 52 and the base 51 extending on the header body 21 and the intake runners 22, the resonance chamber 55 and the connecting passage 56 are formed by joining the cover 52 to the base 51, the opening 56a of the connecting passage 56 is formed in the base 51, and the passage wall 53 extending in the lateral direction in the resonator 50 is formed integrally with the base 51. Thus the connecting passage 56 is isolated from the resonance chamber 55 by the passage wall 53 formed integrally with the base 51, and the connecting passage 56 is formed by joining the cover 52 to the base 51. Therefore, the connecting passage 56 can be easily formed. Since the volume of the connecting passage 56 can be changed by changing the length of the passage wall 53 in the lateral direction A1, a proper resonance frequency can be determined by adjusting a simple structure. Since the connecting passage 56 can be compactly formed inside the resonator 50, the resonator 50 has an improved appearance.

The upstream parts 23 of the intake runners 22 extend from the header body 21 so as to slope down and to form the bottom wall of the resonance chamber 55. The width of the resonator 50, namely, a dimension along a line inclined to the longitudinal direction A2, can be increased by taking advantage of the inclination of the intake runners 22. Thus the volume of the resonance chamber 55 can be efficiently increased without increasing the thickness, namely, a dimension in the direction parallel to the cylinder axes L, of the resonator 50 and without greatly increasing the dimension of the resonator 50 in the longitudinal direction A2.

Modifications of the foregoing embodiment will be explained.

The passage wall 53 may be formed integrally with at least either of the base 51 and the cover 52.

The intake runners 22 and the base 51 of the resonator 50 may be separate members, and the base 51 may be bonded to the intake runners 22 by bonding means, such as welding.

Although the invention has been described as applied to the internal combustion engine E intended for use on a vehicle, the present invention is applicable also to a vertical internal combustion engine having a vertical crankshaft intended to be incorporated into a marine propulsion device, such as an outboard motor.

The above described embodiments are provided with the intake runners 22 of the number equal to the number of the linders 1a. However, the number of the intake runners 22 need not be equal to the number of the cylinders 1a. In a case wherein the cylinder head 2 has a plurality of intake ports 6 for each cylinder, for example, intake runners 22 equal in number to all the intake ports 6 may be provided. In this case, the number of the intake runners 22 would be more than the number the cylinders 1a. Further, in a case wherein the same intake port 6 is connected in branched fashion to a plurality of cylinders 1a within the cylinder head 2, for example, the number the intake runners 22 would be equal to the number of the inlets of the intake ports 6, so that the number of the intake runners 22 is smaller than the number of the cylinder 1a.

What is claimed is:

1. A multicylinder internal combustion engine comprising:
an engine body having plural cylinders;
an intake manifold having a header body disposed opposite to the engine body with respect to a direction parallel to cylinder axes of the cylinders and defining an intake chamber, and intake runners respectively defining intake runner passages branching off from the intake chamber of the header body and communicating with the cylinders; and
a resonator defining a resonance chamber communicating with the intake chamber;
wherein each of the intake runners has a downstream part joined to an intake joint on the engine body, and a bend extending away from the cylinder axes in a direction perpendicular to the cylinder axes, and curving so as to extend reversely toward the cylinder axes to connect to the downstream part; and
wherein the resonator is disposed opposite to the engine body with respect to the intake manifold and is nearer to the cylinder axes than outermost end parts of the bends with respect to the direction perpendicular to the cylinder axes,
wherein each of the intake runners has an upstream part connecting the bend to the header body, and at least a part of the resonator is formed integrally with the upstream parts opposite to the engine body with respect to the intake runners.

2. A multicylinder internal combustion engine comprising:
an engine body having plural cylinders;
an intake manifold having a header body disposed opposite to the engine body with respect to a direction parallel to cylinder axes of the cylinders and defining an intake chamber, and intake runners respectively defining intake runner passages branching off from the intake chamber of the header body and communicating with the cylinders; and
a resonator defining a resonance chamber communicating with the intake chamber;
wherein each of the intake runners has a downstream part joined to an intake joint on the engine body, and a bend extending away from the cylinder axes in a direction perpendicular to the cylinder axes, and curving so as to extend reversely toward the cylinder axes to connect to the downstream part; and wherein the resonator is disposed opposite to the engine body with respect to the intake manifold and is nearer to the cylinder axes than outermost end parts of the bends with respect to the direction perpendicular to the cylinder axes, wherein the resonator includes a base extending on the header body and the intake runners, and a cover covering the base; the base and the cover are joined together to form the resonance chamber and a connecting passage connecting the resonance chamber and the intake chamber;

wherein the connecting passage has an opening which is formed in the base at one end of the connecting passage and which opens into the intake chamber; the resonator has a passage wall formed therein to define the connecting passage and separating the connecting passage from the resonance chamber; and wherein the passage wall extends in a direction in which the intake runner passages are arranged and is formed integrally with at least one of the base and the cover.

3. A multicylinder internal combustion engine comprising:

an engine body having plural cylinders;

an intake manifold having a header body disposed opposite to the engine body with respect to a direction parallel to cylinder axes of the cylinders and defining an intake chamber, and intake runners respectively defining intake runner passages branching off from the intake chamber of the header body and communicating with the cylinders; and a resonator defining a resonance chamber communicating with the intake chamber;

wherein each of the intake runners has a downstream part joined to an intake joint on the engine body, and a bend extending away from the cylinder axes in a direction perpendicular to the cylinder axes, and curving so as to extend reversely toward the cylinder axes to connect to the downstream part; and wherein the resonator is disposed opposite to the engine body with respect to the intake manifold and is newer to the cylinder axes than outermost end parts of the bends with respect to the direction perpendicular to the cylinder axes, wherein the resonator includes a base extending on the header body and the intake runners, and a cover covering the base, and the cover is provided on an inside surface thereof with plural ribs extending in a direction in which the cylinders are arranged.

4. A multicylinder internal combustion engine comprising:

an engine body having plural cylinders;

an intake manifold having a header body disposed opposite to the engine body with respect to a direction parallel to cylinder axes of the cylinders and defining an intake chamber, and intake runners respectively defining intake runner passages branching off from the intake chamber of the header body and communicating with the cylinders; and a resonator defining a resonance chamber communicating with the intake chamber;

wherein each of the intake runners has a downstream part joined to an intake joint on the engine body, and a bend extending away from the cylinder axes in a direction perpendicular to the cylinder axes, and curving so as to extend reversely toward the cylinder axes to connect to the downstream part; and wherein the resonator is disposed opposite to the engine body with respect to the intake manifold and is nearer to the cylinder axes than outermost end parts of the bends with respect to the direction perpendicular to the cylinder axes, wherein the resonator includes a base extending on the header body and the intake runners, and a cover covering the base, and the cover is a top member of the internal combustion engine.

* * * * *